June 29, 1965  J. MORKOSKI ETAL  3,191,688
CUSHION SPRING TRIP UNIT FOR MOLDBOARD PLOWS
Filed March 9, 1964  2 Sheets-Sheet 2
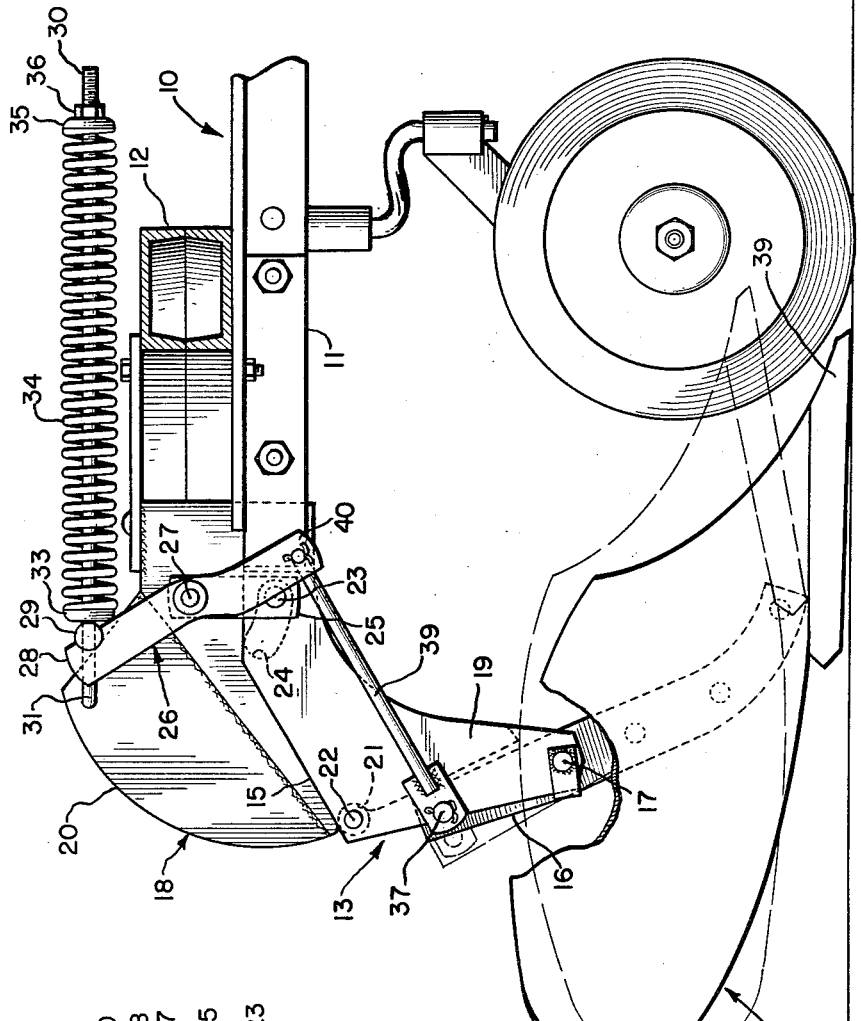
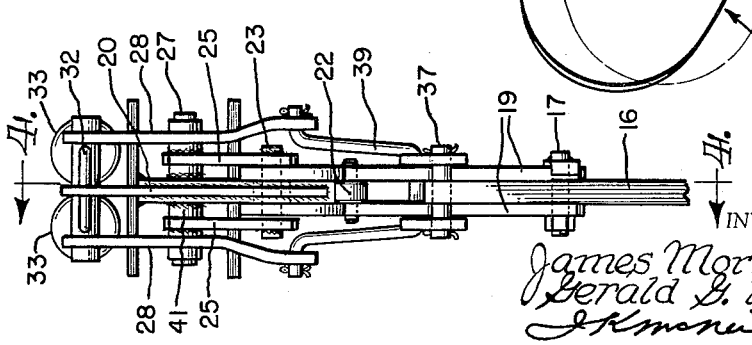
INVENTOR.
James Morkoski
Gerald G. Ward
Atty.

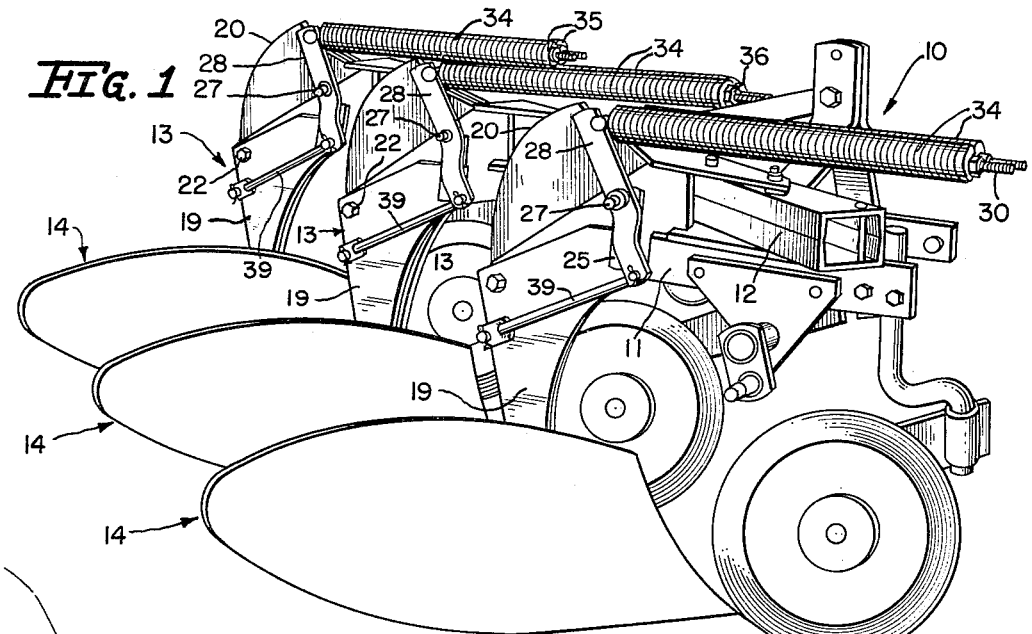
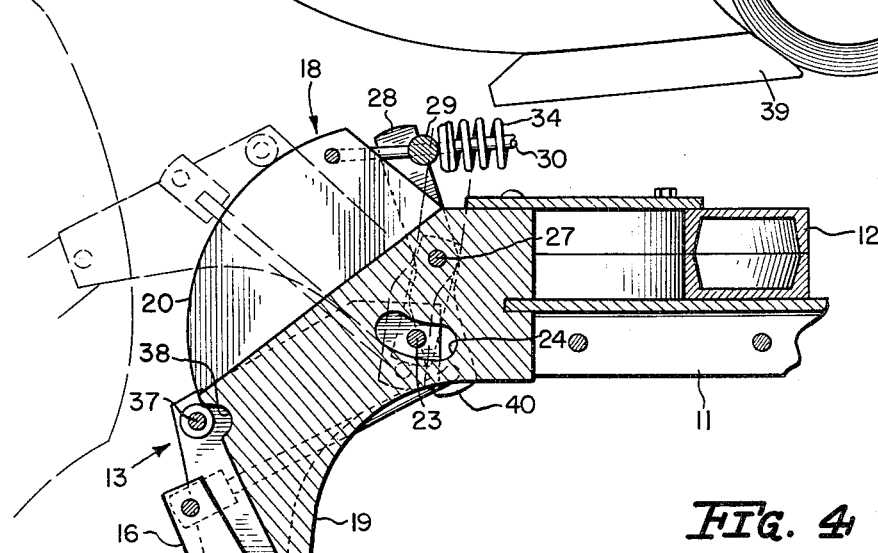
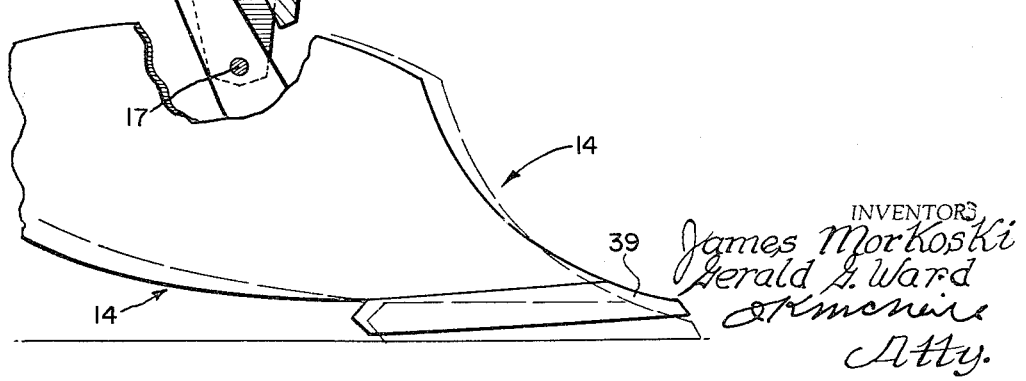

United States Patent Office

3,191,688
Patented June 29, 1965

3,191,688
CUSHION SPRING TRIP UNIT FOR
MOLDBOARD PLOWS
James Morkoski, Clarendon Hills, and Gerald G. Ward, Naperville, Ill., assignors to International Harvester Company, Chicago, Ill., a corporation of New Jersey
Filed Mar. 9, 1964, Ser. No. 350,240
6 Claims. (Cl. 172—269)

This invention relates to agricultural implements and particularly to plows. More specifically, the invention concerns novel cushion trip mechanism for a moldboard plow or the like.

When operating a plow or the like under adverse soil conditions containing rocks and other obstructions, it is important in order to avoid damage to the plow bottoms to allow them to trip out of the way until the obstruction has been passed. It is also important that the plow unit be returned to its operating position as soon as possible. In the past this has required either that the operator of the propelling vehicle dismount and manually return the plow unit which has tripped, or that he back up the plow to allow the soil to force the unit back into its operating position. Such trip devices are well known and have been designed primarily to avoid obstacles or conditions which exert a force against the plow bottom tending to swing the plow unit rearwardly and upwardly in one direction about a transverse pivot. However, especially in rocky soil, the forward end or point of the plow bottom tends to engage certain obstructions with the bottom edge, causing a force having a vertical component to be directed against the bottom of the forward end of the plow resulting in the breakage of plow points and other damage. Therefore, an object of the present invention is the provision of novel plow trip and cushioning mechanism adapted to protect the plow unit against damage when a force is exerted against the earth working tool in either a clockwise or a counterclockwise direction about a transverse pivot axis.

Another object of the invention is the provision of a novel trip mechanism for an earth working tool such as a moldboard plow adapted to yieldably oppose tripping under abnormal soil forces acting against the plow and to automatically return the plow unit to its operating position after an obstruction has been passed.

Other objects and advantages of the invention will become clear from the following detailed description when read in conjunction with the accompanying drawings wherein:

FIGURE 1 is a view in perspective of a multi-bottom plow wherein each plow unit incorporates the features of this invention, FIGURE 2 is a sectional view in side elevation of one of the plow units shown in FIGURE 1, illustrating the manner in which one of the abnormal soil forces acting against the plow is counteracted, FIGURE 3 is an end view of the structure shown in FIGURE 2, and FIGURE 4 is a section taken on the line 4—4 of FIGURE 3.

Referring to the drawings, the numeral 10 designates the frame of a plow including longitudinally extending tool bars 11 and a diagonal backbone or beam 12. A plurality of laterally and longitudinally offset standards in the form of assemblies 13 are mounted on beam 12, and each carries at its lower end a moldboard plow bottom 14.

Standard assembly 13 comprises an upper section 15 formed of laterally spaced plates, and a lower section 16 mounted, medially of its ends, upon a pivot pin 17 carries between the lower ends of the plates forming the upper section 15 of the standard. The plates forming the upper section 15 straddle a plate 18 affixed to the supporting frame 10 and including a lower portion 19 and an upper cam section 20.

A rearwardly opening notch or slot 21 is provided in plate 18 adjacent the juncture of lower section 16 with cam portion 20 and notch 21 cooperates with a pin or roller 22 in upper section 19 of the standard to function as a locking means holding the plow unit against tripping under normal operating conditions. The forward ends of the plates forming upper section 19 of the standard carry a pivot pin 23 received in an arcuately shaped slot 24 formed in plate 18, and upon the outer ends of pin 23 extending through upper section 19 are mounted the arms 25 of laterally spaced levers in the form of bellcranks 26 fulcrumed upon a pin 27 carried by plate 18. The other arms 28 of bellcranks 26 are forwardly notched to receive a crossbar 29 which is apertured to slidably receive the arms 30 of an elongated U-shaped member 31, the bight portion 32 of which extends through an opening in the upper end of plate 18.

Bar 29 engages a pair of washers 33 abutting the ends of a pair of compression springs 34, the other ends of which engage washers 35 held in place by nuts 36 adjustable on the threaded ends of arms 30. As shown in FIGURE 2, springs 34 exert pressure against arms 28 of lever 26 to hold pin 23 at the forward end of slot 24, thus yieldably holding the plow unit in its normal operating position as shown in solid lines in FIGURE 2. When an obstruction is encountered by the plow bottom, exerting a force in a clockwise direction about the axis of pivot pin 23, as viewed in FIGURES 2 and 4, the plow bottom first moves rearwardly until pin or roller 22 is released from slot 21, as indicated in FIGURE 4, and as the soil forces cause the plow to trip, pin 22 rides up the cam 20 until the obstruction is passed, whereupon the springs 34 force the plow back to its operating position.

Although the tripping described is adequate to protect the plow from forces directed in one direction thereagainst, breakage of plow bottoms frequently occurs as a result of the plow point's tendency to slide upwardly over certain obstructions, exerting a force vertically upwardly against the plow point and in a counterclockwise direction as viewed in FIGURE 2. To provide relief against such adverse forces directed against the plow bottom, the pivotal connection 17 is provided for the lower tool carrying section 16 of the plow standard assembly. The upper end of lower section 16 carries a pin 37 which is received in a notch 38 provided in the rear edge of upper section 19. Also mounted on the ends of pin 37 are the rear ends of a pair of links 39, the forward ends of which are pivotally connected to the lower ends of auxiliary arms 40 of lever 26, arm 25 being spaced axially therefrom and welded to a sleeve 41 carrying pin 27.

Normal draft forces acting on the plow bottom 14 during operation are directed rearwardly, and when obstructions are encountered which exert a force downwardly against the forward end or point 39 of the plow bottom, the shock to the implement is absorbed by the capacity of the tool-carrying standard to move rearwardly within the limits of pin 23 in slot 24. As pin 23 and standard 13 move rearwardly they carry with them arm 25, rocking lever 26 clockwise as viewed in FIGURE 2 and compressing spring 34, the latter exerting force to return pin 23 to the forward end of its slot.

Under sufficient draft load pin 22 moves out of slot 21 and the plow trips, pin 22 riding up over the cam 20 and being urged to return to its slot by the springs 34.

This tripping of the plow bottom rearwardly and upwardly in a clockwise direction about the moving pivot 23 protects the plow unit against certain types of obstructions. However, many of the obstructions encountered are of the type that the forward end or point 39 of the plow bottom tends to rise over. When this occurs, the entire weight of the implement rests upon the plow point resulting in breakage. In order to minimize the damage from this source, the lower section 16 of the tool-carrying standard assembly is mounted for pivotal movement about the axis of pin 17. Thus, when a rock engages the lower edge of point 39 of the plow bottom exerting a force vertically upwardly against it, the lower section 16 swings counterclockwise to the dotted line position of FIGURE 2. Such swinging of the plow carrying lower section 16 acts through links 39 and lever 26 to again compress spring 34 acting to return the plow bottom to its normal operating position.

It is believed that the construction and operation of the novel plow trip and cushioning mechanism of this invention will be clearly understood from the foregoing description. It should likewise be understood that the invention has been described in its preferred embodiment only, and that modifications may be made therein without departing from the spirit of the invention or the scope of the appended claims.

What is claimed is:

1. In a trip beam plow having a traveling supporting frame and a plow-carrying standard assembly, means mounting the standard assembly on the supporting frame for tripping of the entire assembly in one direction in response to abnormal draft conditions encountered by the plow comprising, a lever mounted on the frame by pivot means accommodating longitudinal rocking of the lever on a transverse axis and connected to the standard assembly for angular swinging movement of the latter in one direction rearwardly and upwardly about said axis, spring means connected between the frame and said lever and opposing the tripping of the plow-carrying standard assembly, said standard assembly including an upper frame-connected section and a lower plow-carrying section, and pivot means connecting said plow-carrying section to said frame-connected section for angular swinging movement of the plow-carrying section in a direction opposite to the direction of tripping of said standard assembly, said spring means being operatively connected to said plow-carrying section to oppose said angular swinging movement thereof.

2. The invention set forth in claim 1, wherein the pivotal connection of the upper section of said standard assembly to said frame includes a pin carried by said lever and a generally longitudinally extending slot formed in said frame slidably receiving said pin to accommodate rearward movement of the standard assembly prior to tripping thereof.

3. The invention set forth in claim 2, wherein a roller is mounted on the upper section of said standard assembly and a rearwardly opening notch is formed on the frame to receive said roller, said roller being releasable from said notch after a predetermined rearward movement of the standard assembly in response to abnormal draft forces acting on said plow-carrying lower section to accommodate tripping of the plow standard assembly.

4. The invention set forth in claim 2, wherein said lever is in the form of a bell crank having one arm connected to said spring and another arm carrying said pin, link means being provided connecting said other arm to the lower section of said standard assembly to hold the latter against angular movement relative to said upper section.

5. In a trip beam plow having a traveling frame, an articulated tool-carrying standard comprising an upper section pivotally connected to the frame for rearward and upward swinging to a tripped position about a transverse axis and a lower tool-carrying section pivotally connected to said upper section for forward and upward swinging relative thereto about a transverse axis, spring means, means connecting the latter to said frame and to said upper section to yieldably oppose said rearward and upward swinging of said standard, the last said means including means operatively connecting said spring means to said lower tool-carrying section to yieldably oppose said forward and upward swinging of said lower section relative to said upper section.

6. The invention set forth in claim 5, wherein cooperative means are provided on said upper section and said frame for locking the standard against tripping and the pivotal connection of said upper section to the frame includes means accommodating a predetermined rearward movement of the standard relative to the frame against the action of said spring means prior to release of said locking means.

No references cited.

T. GRAHAM CRAVER, *Primary Examiner.*